(12) United States Patent
Kimoto

(10) Patent No.: US 11,892,434 B2
(45) Date of Patent: Feb. 6, 2024

(54) ANALYZING SYSTEM

(71) Applicant: SHIMADZU CORPORATION, Kyoto (JP)

(72) Inventor: Yasuhiro Kimoto, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 622 days.

(21) Appl. No.: 17/086,660

(22) Filed: Nov. 2, 2020

(65) Prior Publication Data
US 2021/0231623 A1   Jul. 29, 2021

(30) Foreign Application Priority Data
Jan. 27, 2020   (JP) .................................. 2020-011067

(51) Int. Cl.
| | | |
|---|---|---|
| *G01N 30/86* | (2006.01) | |
| *G01N 35/00* | (2006.01) | |
| *G01N 30/02* | (2006.01) | |

(52) U.S. Cl.
CPC ... *G01N 30/8651* (2013.01); *G01N 35/00584* (2013.01); *G01N 2030/025* (2013.01)

(58) Field of Classification Search
CPC ........... G01N 30/8651; G01N 30/8658; G01N 30/02; G01N 35/00584; G01N 35/00871; G01N 2030/025

(Continued)

(56) References Cited

U.S. PATENT DOCUMENTS

| | | | | |
|---|---|---|---|---|
| 6,798,997 | B1* | 9/2004 | Hayward | ........... G06Q 30/0605 |
| | | | | 399/24 |
| 2007/0229818 | A1* | 10/2007 | Duan | ...................... G01J 3/443 |
| | | | | 356/316 |

(Continued)

FOREIGN PATENT DOCUMENTS

| | | | | |
|---|---|---|---|---|
| CN | 110300894 A | * | 10/2019 | ....... G01N 35/00712 |
| JP | 01-47945 A | | 2/1989 | |

(Continued)

OTHER PUBLICATIONS

Japanese Office Action dated Apr. 4, 2023 in Japanese Application No. 2020-011067.

(Continued)

*Primary Examiner* — Jeffrey P Aiello
(74) *Attorney, Agent, or Firm* — Sughrue Mion, PLLC

(57) ABSTRACT

In an analyzing system including an analyzing device 10, 20 and a control computer 40, the analyzing device includes: an information input receiver 30 configured to receive an input of information which is encoded in a predetermined format and specifies a method file; and an information sender 23 configured to send the control computer the information received by the information input receiver. The control computer includes: a storage section 413 in which a plurality of method files each describing an analysis condition are stored; a method file locator 423 configured to locate a method file corresponding to the information sent from the information sender among the plurality of method files; an analysis condition setter 424 configured to set an analysis condition of the analyzing device based on the located method file; and an analysis controller 425 configured to control an operation of the analyzing device based on the analysis condition.

9 Claims, 2 Drawing Sheets

(58) Field of Classification Search
USPC ..... 702/31, 19, 182, 183, 188, 189, 22, 179, 702/127, 23, 57, 85; 703/11, 13, 1, 6; 709/217–219, 224
See application file for complete search history.

(56) References Cited

U.S. PATENT DOCUMENTS

| | | | | |
|---|---|---|---|---|
| 2008/0244034 | A1* | 10/2008 | Shannon | H04L 67/125 709/228 |
| 2009/0075325 | A1* | 3/2009 | Das | G01N 24/08 250/311 |
| 2012/0321514 | A1* | 12/2012 | Itou | G01N 35/00871 422/65 |
| 2018/0313793 | A1* | 11/2018 | Takakura | G01N 30/06 |

FOREIGN PATENT DOCUMENTS

| | | | | |
|---|---|---|---|---|
| JP | 2005-257548 A | 9/2005 | | |
| JP | 2005-283344 A | 10/2005 | | |
| JP | 2009-47592 A | 3/2009 | | |
| JP | 2012-181023 A | 9/2012 | | |
| JP | 2013-3057 A | 1/2013 | | |
| JP | 2013-500495 A | 1/2013 | | |
| WO | 2011/017082 A2 | 2/2011 | | |
| WO | WO-2012103511 A2 * | 8/2012 | ............ | B01L 3/5023 |
| WO | 2017/072893 A1 | 5/2017 | | |

OTHER PUBLICATIONS

Communication dated Sep. 9, 2022 from The State Intellectual Property Office of P.R. of China in Application No. 202110018008.0.

Office Action dated May 30, 2023 in Chinese Application No. 202110018008.0.

Japanese Office Action dated Oct. 31, 2023 in Application No. 2020-011067.

Chinese Office Action dated Oct. 23, 2023 in Application No. 202110018008.0.

* cited by examiner

ANALYZING SYSTEM

TECHNICAL FIELD

The present invention relates to an analyzing system including an analyzing device, such as a chromatograph, and a control computer which controls the operation of the analyzing device.

BACKGROUND ART

Gas chromatographs are widely used for analyses aimed at testing residual agricultural chemicals contained in food products or for other purposes (for example, see Patent Literature 1). A gas chromatograph is located within an analysis room, for example. A control computer which controls the operation of the gas chromatograph is located in a separate control room. In this control computer, a plurality of method files are typically stored in which different analysis conditions are individually described depending on the kind of sample and purpose of the analysis.

For an analysis of a sample using a gas chromatograph, an analysis operator using the control computer initially sets analysis conditions of the gas chromatograph by selecting a method file to be used for the analysis of the sample. After setting the sample in the gas chromatograph, the analysis operator enters a command to initiate the analysis. Upon initiating the analysis, the control computer conducts the analysis of the sample by controlling the gas chromatograph according to the analysis conditions described in the selected method file. The analysis data on the sample acquired with the gas chromatograph are sent to and stored in the control computer.

CITATION LIST

Patent Literature

Patent Literature 1: WO 2017/072893 A

SUMMARY OF INVENTION

Technical Problem

As just described, the conventional analyzing system requires the analysis operator to set analysis conditions of the gas chromatograph using the control computer in the control room, and also set the sample in the gas chromatograph and perform the analysis in the analysis room. Therefore, when analyses of samples need to be repeatedly performed, the analysis operator needs to go back and forth between the control computer in the control room and the gas chromatograph in the analysis room for each analysis.

Although the previously described example is associated with a gas chromatograph, a similar problem also occurs with other types of analyzing devices.

The problem to be solved by the present invention is to provide an analyzing system which allows analyses of samples to be repeatedly performed without requiring an analysis operator to go back and forth between the control computer and the analyzing device even when these two units are remotely located from each other.

Solution to Problem

The present invention developed for solving the previously described problem is an analyzing system including an analyzing device for analyzing a sample and a control computer configured to be capable of communicating with the analyzing device, in which:

the analyzing device includes:

an information input receiver configured to receive an input of information which is encoded in a predetermined format and specifies a method file; and an information sender configured to send the control computer the information received by the information input receiver, and the control computer includes:

a storage section in which a plurality of method files each describing an analysis condition are stored;

a method file locator configured to locate a method file corresponding to the information sent from the information sender among the plurality of method files;

an analysis condition setter configured to set an analysis condition of the analyzing device based on the method file located by the method file locator; and an analysis controller configured to control an operation of the analyzing device based on the analysis condition.

Advantageous Effects of Invention

The analyzing system according to the present invention has a plurality of method files stored beforehand in the storage section of the control computer. The analyzing system according to the present invention initially allows an analysis operator to input, into the information input receiver, a piece of information which is encoded in a predetermined format and specifies a method file. For example, the predetermined format may be a two-dimensional code, in which case the information input receiver is a two-dimensional code reader. When the information input receiver receives an input of the information, the information sender transmits the information to the control computer. In the control computer, when the information is received from the information sender, the method file locator locates the method file corresponding to the received information among the plurality of method files stored in the storage section. The analysis condition setter sets an analysis condition of the analyzing device based on the located method file. The analysis operator subsequently issues a command to initiate the analysis. Then, the analysis controller conducts the analysis of the sample by controlling an operation of the analyzing device based on the analysis condition. In the analyzing system according to the present invention, the setting of the analysis condition of the analyzing device requires the analysis operator to merely input into the analyzing device a piece of information encoded in a predetermined format. Therefore, even in the case where the control computer and the analyzing device are remotely located from each other, the analysis operator does not need to go back and forth between the two units while repeating analyses of samples. Furthermore, since the analysis operator himself/herself does not need to operate the control computer, there is no possibility that the analysis operator will set an incorrect analysis condition.

DESCRIPTION OF EMBODIMENTS

One embodiment of the analyzing system according to the present invention is hereinafter described with reference to the attached drawings. The analyzing device 1 according to the present embodiment is roughly divided into a gas chromatograph unit and a control computer 40 configured to control the operation of the gas chromatograph (GC) unit. The GC unit includes a gas chromatograph main unit 10 and a system controller 20, both located in an analyzing room along with other types of analyzing devices. The control computer 40 is located in a control room. The system controller 20 and the control computer 40 can communicate with each other through a network.

Figure 1:
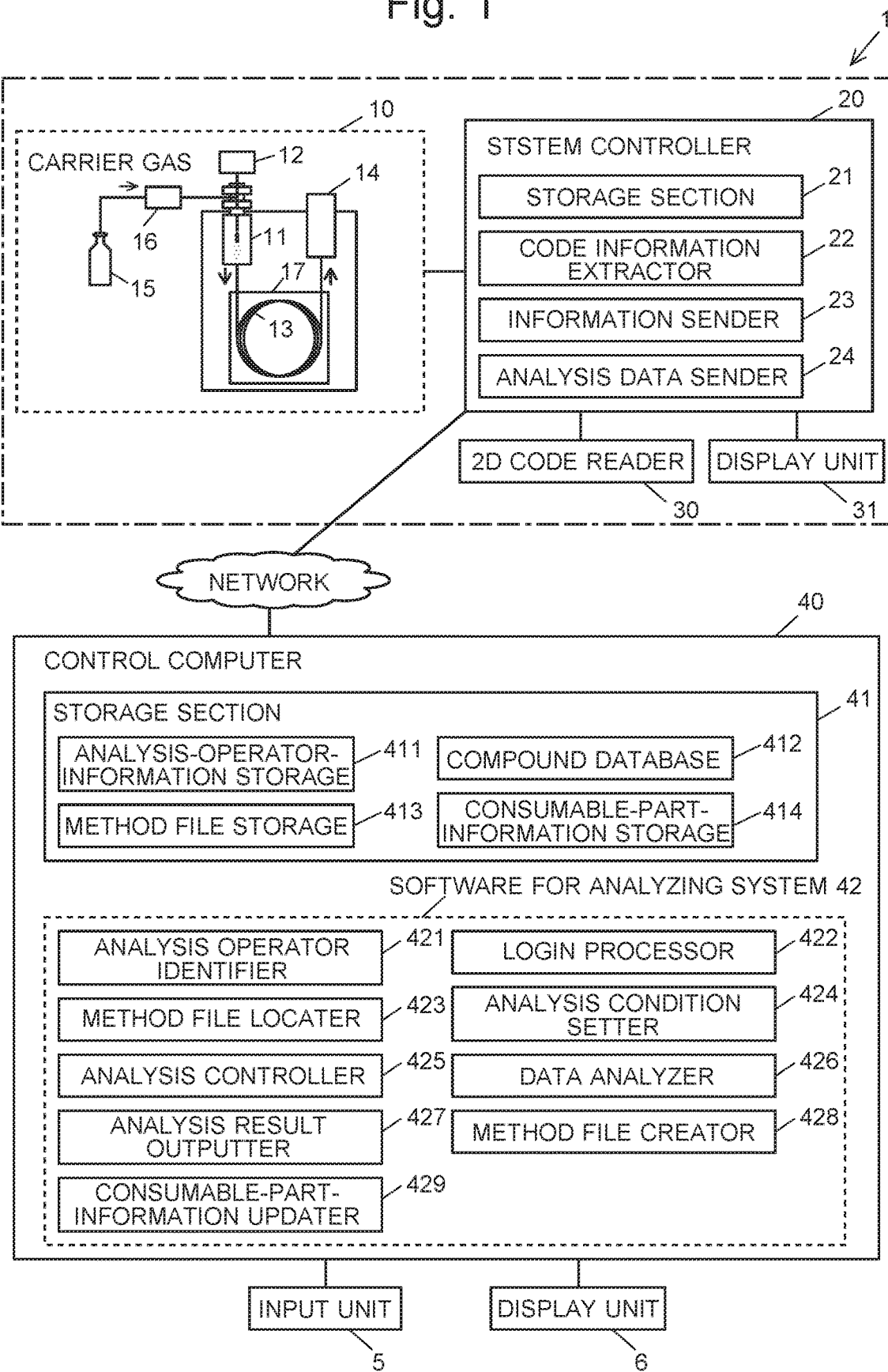
FIG. 1 is a configuration diagram showing the main components of an analyzing system including a gas chromatograph as one embodiment of the analyzing system according to the present invention.

As shown in FIG. 1, the gas chromatograph main unit 10 includes a sample vaporization chamber 11 configured to heat and vaporize a liquid sample, an autosampler 12 configured to inject a liquid sample into the sample vaporization chamber 11, a column 13 configured to separate components of the sample vaporized in the sample vaporization chamber 11, and a detector 14 configured to detect the components separated by the column 13. The sample vaporization chamber 11 is supplied with carrier gas, such as nitrogen gas, contained in a gas cylinder 15. The flow rate of the carrier gas is controlled to be a predetermined flow rate (or flow velocity) by a flow controller (AFC) 16. The vaporized sample within the sample vaporization chamber 11 is carried into the column 13 by the flow of the carrier gas. The column 13 is contained in a column oven 17 heated to a predetermined temperature.

The sample vaporization chamber 11 and autosampler 12, detector 14, flow controller 16, column oven 17 as well as other related sections are each provided in the form of a module so that an appropriate combination of modules can be used according to the property of the sample and/or purpose of the analysis. Those modules are connected to the system controller 20 and operate according to control signals from the system controller 20. In the present embodiment, the system controller 20 is also incorporated as one of the modules constituting the GC unit.

The system controller 20 includes a storage section 21 as well as a code information extractor 22, information sender 23, and analysis data sender 24 as its functional blocks. The system controller 20 is equipped with a two-dimensional code reader 30. In the present embodiment, the two-dimensional code reader 30 functions as the information input receiver. The functional blocks of the system controller 20 are previously installed before the shipment of the system controller. A display unit 31 including a touch screen is provided, which can also function as an input unit that allows users to appropriately perform input operations by touching predetermined positions on the screen.

The control computer 40 includes a storage section 41 as well as an analysis operator identifier 421, login processor 422, method file locator 423, analysis condition setter 424, analysis controller 425, data analyzer 426, analysis result outputter 427, method file creator 428 and consumable-part-information updater 429 as its functional blocks. The control computer 40 is actually a commonly used personal computer, with the aforementioned functional blocks embodied by executing software for the analyzing system 42 previously installed on the computer. An input unit 5 and a display unit 6 are connected to the control computer 40.

The storage section 41 has an analysis-operator-information storage section 411, compound database 412, method-file storage section 413 and consumable-part-information storage section 414.

The analysis-operator-information storage section 411 holds identification information of each analysis operator who has been allowed to perform a sample analysis and data analysis using a gas chromatograph. For example, the identification information of an analysis operator includes an identification number, company name, department to which the operator belongs, and personal name.

The compound database 412 holds a collection of various kinds of information related to a plurality of known compounds. Specifically, the database holds the following items of information for each compound: compound name, classification (e.g. drug, metabolite, etc.), measurement conditions (type of column, temperature of column, amount of injection, method of injection, flow rate of carrier gas, use conditions of the detector, etc.), and calibration curve information.

The method-file storage section 413 holds method files, i.e. files which describe information concerning the analysis condition (e.g. analysis name and target compound) and data-analyzing method (e.g. peak detection method and baseline correction method for the chromatogram) to be used for an analysis of a sample. Each method file is linked with the corresponding method-file identification information (e.g. identification number or file name).

The consumable-part-information storage section 414 holds information for each consumable part used in the gas chromatograph main unit 10, such as the part name, identification number, use location, and replacement date.

An operation of the analyzing system 1 according to the present invention is as follows:

Initially, an analysis operator holds the two-dimensional code printed on his/her employee ID card (or other types of media) over the two-dimensional code reader 30. This two-dimensional code contains a code which indicates that the two-dimensional code concerned is the identification number of an analysis operator, as well as a piece of information showing the identification number of the analysis operator. When the two-dimensional code is held over the two-dimensional code reader 30, the code information extractor 22 reads the identification information of the analysis operator from the two-dimensional code. The information sender 23 sends the identification information to the control computer 40. Understandably, the medium which shows the two-dimensional code is not limited to the employee ID card. It may be displayed on a piece of paper, or the screen of a smartphone or similar electronic device.

In the control computer 40, the analysis operator identifier 421 begins operating, based on the fact that the code corresponding to the identification number of the analysis operator is contained in the information received from the information sender 23. The analysis operator identifier 421 compares the received identification number with the identification information of each analysis operator stored in the analysis-operator-information storage section 411.

If the received identification number of the analysis operator has been located in the analysis-operator-information storage section 411, the login processor 422 subsequently performs the login processing for the analysis operator, and notifies the system controller 20 of the completion of the processing. Upon receiving the notification, the system controller 20 displays a message on the display unit 31, which says, for example, "the login of XXX (name of the analysis operator) has been completed". After the completion of the login processing for the analysis operator, the system can perform operations by the method file locator 423, analysis condition setter 424, analysis controller 425, data analyzer 426, analysis result outputter 427, method file creator 428, and consumable-part-information updater 429, as will be described later.

After the login processing, the analysis operator sequentially sets a plurality of vial containers which contain samples to be analyzed into the autosampler 12. Each vial container used in the present embodiment has a two-dimensional code printed on its surface. The two-dimensional code contains a code which indicates that the two-dimensional code concerned is related to a method file, as well as method-file identification information (e.g. identification number or file name). When the two-dimensional code printed on a vial container is held over the two-dimensional code reader 30 by the analysis operator, the code information extractor 22 reads the identification information of the method file from the two-dimensional code. The information sender 23 sends the identification information to the control computer 40.

In the control computer 40, the method file locator 423 begins operating, based on the fact that the code corresponding to the method file is contained in the information received from the information sender 23. The method file locator 423 reads, from the method files stored method-file storage section 413, the method file corresponding to the method-file identification information received from the information sender 23.

After the method file has been located, the analysis condition setter 424 reads information concerning analysis conditions from the method file. In the present embodiment, the name of the target compound is included in the information concerning analysis conditions. The analysis condition setter 424 reads information concerning the measurement conditions of that compound from the compound database 412 and sets the analysis conditions of the same compound.

The steps of reading the identification information of the vial container, locating the method file, and setting the analysis conditions are repeated every time a vial container is held over the two-dimensional code reader 30 by the analysis operator. After the tasks of scanning the two-dimensional code of a vial container with the two-dimensional code reader 30 and setting the container in the autosampler 12 have been completed for all vial containers, the analysis operator presses the "Sample Setting Completed" button displayed on the display unit 31 of the system controller 20. Then, the information sender 23 notifies the control computer 40 of the fact that the button has been pressed.

In the control computer 40, the analysis condition setter 424 totals the number of samples for which it has already received the setting of analysis conditions, and informs the system controller 20 of the number of samples. The system controller 20 displays the received number of samples on the display unit 31. The analysis operator confirms that the number of vial containers which he/she has set in the autosampler 12 is equal to the number of samples displayed on the display unit 31, and presses the "OK" button. The system controller 20 notifies the control computer 40 of the fact that the "OK" button has been pressed.

Upon receiving the notification, the control computer 40 sets an analysis sequence in order of the setting of the analysis condition, creates a batch file for executing the analysis sequence, and stores this file in the storage section 41. After the batch file has been stored, the control computer 40 sends the system controller 20 a notification of the completion of the preparation for the analysis.

Upon receiving the notification of the completion of the preparation for the analysis, the system controller 20 displays the "Start Measurement" button on the display unit 31. When this button is pressed by the user, the system controller 20 sends the control computer 40 a notification of the beginning of the analysis.

Upon receiving the notification of the beginning of the analysis, the analysis controller 425 sequentially sends the system controller 20 control signals for controlling the analyzing operation of the GC unit based on the batch file stored in the storage section 41. Thus, the samples are sequentially subjected to the analysis. After the beginning of the analysis of the samples, the acquired analysis data are sequentially sent from the analysis data sender 24 to the control computer 40, to be stored in the storage section 41.

After the analyses of all samples have been completed, the data analyzer 426 performs a data analysis for each sample based on the data-analyzing method described in the method file. For example, it performs the baseline processing and peak detection of a chromatogram acquired by the gas chromatograph. Then, the data analyzer 426 retrieves, from the compound database 412, necessary information for the analysis of the compound described in the method file. For example, the "necessary information for the analysis" includes the retention time of the compound and calibration information (the information expressing the correspondence relationship between the peak area and the amount of compound). The data analyzer 426 sequentially processes the analysis data stored in the storage section 41. Thus, the entire series of the processing related to the sample analysis and data analysis is completed.

After the analyses of all samples have been completed, the analysis operator goes to the control computer 40. On this computer, the analysis operator specifies a sample for which the sample analysis and data analysis has been completed, and enters a command to output the analysis report. The analysis result outputter 427 creates a report which shows, in addition to the analysis result for the sample, a two-dimensional code containing information concerning the sample analysis condition and data-analyzing method, i.e. the contents of the method file. When the analysis operator enters a command to print the report, the two-dimensional code is printed on a sheet of paper along with the analysis result. For example, the analysis result shown in the analysis report may include a chromatogram acquired through the analysis, an enlarged view of the peak of the target compound included in the chromatogram, the area value of the peak, and the quantitative value of the compound. It is also possible to display the two-dimensional code on the screen of the display unit 6 so that the analysis operator can take an image of the two-dimensional code with a portable terminal (smartphone or tablet computer).

Figure 2:
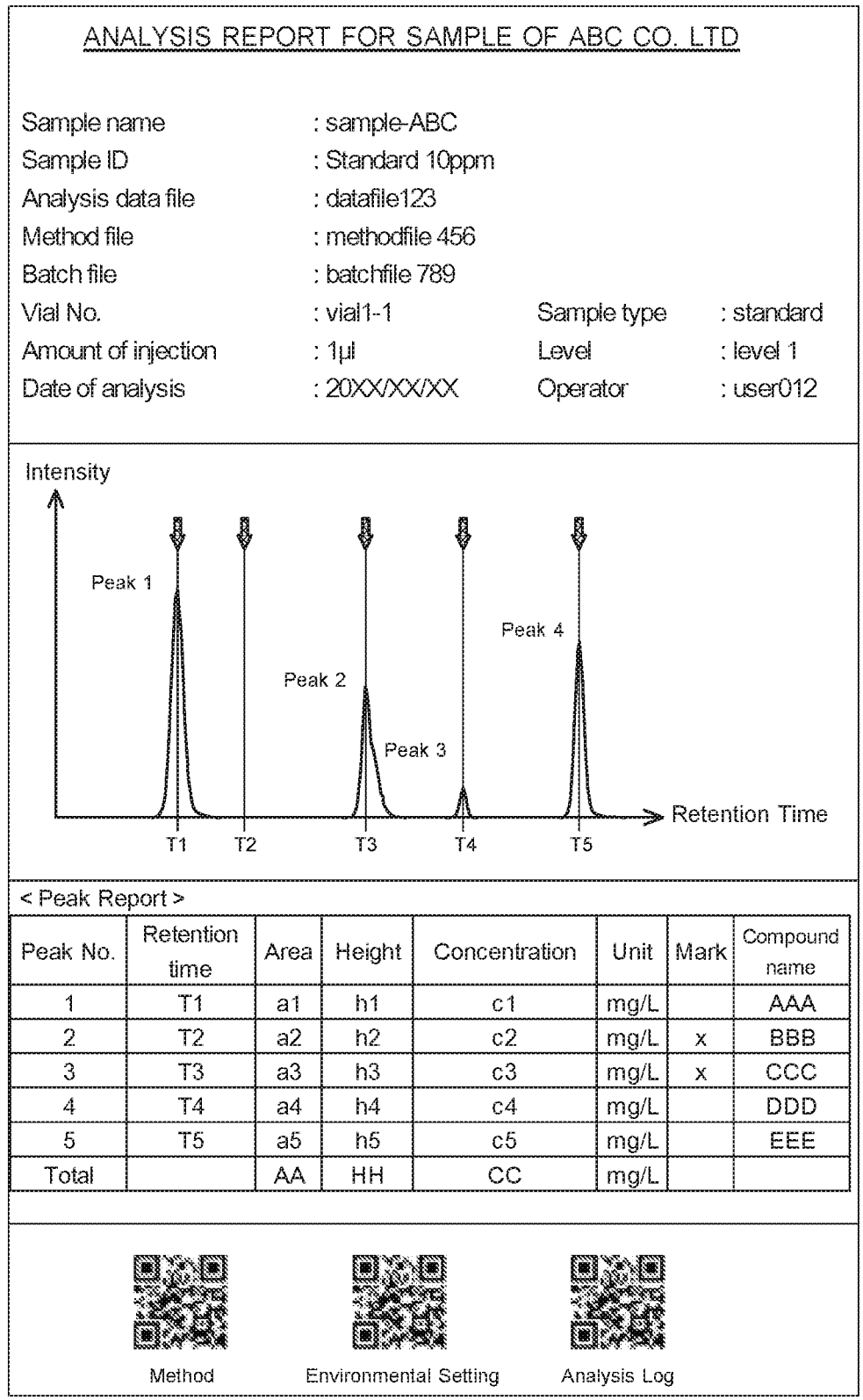
FIG. 2 is one example of an analysis report created in the analyzing system according to the present embodiment.

In addition to the two-dimensional code containing the information of the method file as mentioned in the pervious embodiment, another two-dimensional code which contains the environmental setting of the GC unit (the setting of whether or not the gas-saving mode should be used in the case where the analysis is not performed, and the period of time for the GC unit to transition to the standby state after the completion of the analysis) may also be printed on the analysis report. By printing the two-dimensional code of the environmental setting and holding it over the two-dimensional code reader of the system controller of another GC unit, the analysis operator can easily transfer the environmental setting to another analyzing system. FIG. 2 shows one example of the analysis report. The items to be shown on the analysis report, and the layout of the report, can be appropriately changed. As another possibility, the analysis operator may display the two-dimensional code on a portable terminal and holds it over the two-dimensional code reader of the system controller of another GC unit.

When a two-dimensional code outputted in the previously described manner in another analyzing system including a gas chromatograph having a similar configuration is held over the two-dimensional code reader 30 of the system controller 20, the code information extractor 22 reads the previously described information from the code. The read information is sent from the information sender 23 to the control computer 40.

In the control computer 40, the method file creator 428 begins operating, based on the fact that the code corresponding to the contents of the method file is contained in the information received from the information sender 23. The method file creator 428 creates a new method file which describes the sample analysis conditions and data-analyzing methods received from the information sender 23. After confirming that there is no existing method file which is identical to the new method file in terms of the description of the analysis conditions and data-analyzing methods, the method file creator 428 stores the newly created method file in the method-file storage section 413. Although the example described thus far is associated with the case where a new method file is added to the method-file storage section 413 in which one or more method files have already been stored, it is naturally possible to use the same procedure to transfer method files used in another analyzing system to a new analyzing system (with no method file stored in the method-file storage section 413).

In the analyzing system 1 according to the present embodiment, the two-dimensional code is also used for the management of consumable-part information. There are various examples of the consumable parts used in the gas chromatograph main unit 10, such as the glass insert and septum used in the injector, a column, a syringe used in the autosampler, and a collector used in a flame ionization detector. Failing to duly exchange those consumable parts leads to an incorrect analysis. Therefore, in many cases, the timing for the replacement is managed for each consumable part.

In the analyzing system 1 according to the present embodiment, a two-dimensional code is attached to each consumable part. The two-dimensional code contains a code which indicates that the contained information relates to a consumable part, as well as a collection of related information, such as the name, identification number and use location of the consumable part. When replacing a consumable part, the analysis operator holds the two-dimensional code attached to that consumable part over the two-dimensional code reader 30. Then, the code information extractor 22 extracts the information from the code, and the information sender 23 sends the information to the control computer 40.

In the control computer 40, the consumable-part-information updater 429 begins operating, based on the fact that the code corresponding to the consumable part is contained in the information received from the information sender 23. The consumable-part-information updater 429 reads, from the consumable-part-information storage section 414, the information concerning the consumable part received from the information sender 23, and updates the information of the replacement date of the consumable part concerned. In a gas chromatograph or liquid chromatograph, various kinds of consumable parts are used. If the timing for the replacement and other items of information of all consumable parts should be manually managed, the analysis operator would be forced to perform cumbersome tasks. Correct management would also be difficult in that case. In the analyzing system 1 according to the present embodiment, the consumable-part information can be easily managed by merely holding the two-dimensional code attached to the consumable part over the two-dimensional code reader 30.

The previous embodiment is a mere example and can be appropriately changed within the spirit of the present invention. In the previous embodiment, a parameter value (or information including a parameter value) is displayed in the form of a two-dimensional code, and the user scans the displayed code with an application terminal (two-dimensional code reader) on a portable. A different output form may also be adopted. For example, an RFID tag may be provided at a predetermined position near the touch screen so as to output information at this RFID tag and allow the user to read the information with an application (RFID reader) on a portable terminal.

Although a gas chromatograph is used in the previous embodiment, a configuration similar to the previously described one can suitably be applied in a liquid chromatograph which includes various modules combined together as in the gas chromatograph. Needless to say, a configuration similar to the one described in the previous embodiment can also be applied in an analyzing device other than chromatographs.

It is also possible to prepare two-dimensional codes corresponding to control commands, such as a command to discontinue an analysis during the execution of the analysis or temporarily halt the analysis for an interruptive analysis of another sample, or a command to add an analysis of a new sample after the beginning of an analysis. By holding those codes over the two-dimensional code reader 30, the user can change the contents of the control of the analyzing device by the control computer 40.

MODES OF INVENTION

A person skilled in the art can understand that the previously described illustrative embodiments are specific examples of the following modes of the present invention.

(Clause 1)

An analyzing system according to one mode of the present invention is an analyzing system including an analyzing device for analyzing a sample and a control computer configured to be capable of communicating with the analyzing device, in which:

the analyzing device includes:
an information input receiver configured to receive an input of information which is encoded in a predetermined format and specifies a method file; and
an information sender configured to send the control computer the information received by the information input receiver, and the control computer includes:
a storage section in which a plurality of method files each describing an analysis condition are stored;

a method file locator configured to locate a method file corresponding to the information sent from the information sender among the plurality of method files;

an analysis condition setter configured to set an analysis condition of the analyzing device based on the method file located by the method file locator; and an analysis controller configured to control an operation of the analyzing device based on the analysis condition.

The analyzing system described in Clause 1 has a plurality of method files stored beforehand in the storage section of the control computer. The analyzing system described in Clause 1 initially allows an analysis operator to input, into the information input receiver, a piece of information which is encoded in a predetermined format and specifies a method file. For example, the predetermined format may be a two-dimensional code, in which case the information input receiver is a two-dimensional code reader. When the information input receiver receives an input of the information, the information sender transmits the information to the control computer. In the control computer, when the information is received from the information sender, the method file locator locates the method file corresponding to the received information among the plurality of method files stored in the storage section. The analysis condition setter sets an analysis condition of the analyzing device based on the located method file. The analysis operator subsequently issues a command to initiate the analysis. Then, the analysis controller conducts the analysis of the sample by controlling an operation of the analyzing device based on the analysis condition. In the analyzing system according to the present invention, the setting of the analysis condition of the analyzing device requires the analysis operator to merely input into the analyzing device a piece of information encoded in a predetermined format. Therefore, even in the case where the control computer and the analyzing device are remotely located from each other, the analysis operator does not need to go back and forth between the two units while repeating analyses of samples. Furthermore, since the analysis operator himself/herself does not need to operate the control computer, there is no possibility that the analysis operator will set an incorrect analysis condition.

(Clause 2)

The analyzing system described in Clause 1 may be configured as follows:

the method files stored in the storage section further include information concerning a data-analyzing method, and a compound database is further stored in the storage section;

the analyzing device further includes:
an analysis data sender configured to send analysis data to the control computer; and the control computer further includes:
a data analyzer configured to analyze analysis data received from the analysis data sender, by using a data-analyzing method described in the method file located by the method file locator, with reference to the compound database, to perform a data analysis for a compound described in the method file.

The analyzing system described in Clause 2 can analyze analysis data without requiring an analysis operator to operate the control computer.

(Clause 3)

In the analyzing system described in Clause 2, the control computer may further include an analysis result outputter configured to output a result of a data analysis performed by the data analyzer as well as an analysis condition used for an analysis of the sample and the data-analyzing method used for the data analysis, where the analysis condition and the data-analyzing method are encoded in a predetermined format.

(Clause 4)

The analyzing system described in Clause 3 may be configured as follows:

the information input receiver is further configured to receive an input of information of an analysis condition and/or data-analyzing method encoded in a predetermined format; and the control computer further includes a method file creator configured to create a method file describing the received analysis condition and/or data-analyzing method, and to store the method file in the storage section.

The analyzing system described in Clause 3 or 4 can conveniently create a method file describing a new analyzing condition and/or data-analyzing method, and store the method file in the storage section of the control computer, by scanning a code produced by the analysis result outputter with the information input receiver.

(Clause 5)

In the analyzing system described in one of Clauses 1-4, the information which is encoded in a predetermined format and specifies a method file is shown on a sample container.

In the analyzing system described in Clause 5, a code is shown on a sample container, such as a vial container, to be set in an autosampler (or the like). This allows the setting of a sample container and the scanning of a predetermined code to be performed as a continuous task, whereby the information which specifies a method file can be assuredly read for all samples without omission.

(Clause 6)

In the analyzing system described in Clause 5, the information shown on the sample container may further include information related to a property of a sample.

By the analyzing system described in Clause 6, analysis data and data-analysis result for a sample can be related to properties of the sample, such as the type of sample (standard sample or real sample), client name, sample number, etc.

(Clause 7)

The analyzing system described in one of Clauses 1-6 may be further configured as follows:

the information input receiver is configured to receive an input of information which is encoded in a predetermined format and identifies an analysis operator;

the storage section further contains identification information related to a plurality of analysis operators;

the control computer further includes:
an analysis operator identifier configured to identify an analysis operator corresponding to the information sent from the information sender among the plurality of analysis operators; and a login processor configured to perform a login processing for allowing the analysis operator identified by the analysis operator identifier to log into the control computer; and the analysis condition setter and the analysis controller are configured to begin operating in response to the login processing.

The analyzing system described in Clause 7 allows an analysis operator to log into the control computer without going to the same computer. It can also prevent the control computer from being operated by someone who is not an analysis operator having a previously given permission.

(Clause 8)

The analyzing system described in one of Clauses 1-7 may be further configured as follows:

consumable-part information is further stored in the storage section, the consumable-part information including information representing the type of consumable part used in the analyzing device and the timing to replace the consumable part;

the information input receiver is configured to read information which is encoded in a predetermined format and specifies the type of consumable part, from a consumable-part-showing section on which this information is shown; and the control computer further includes:

a consumable-part-information updater configured to determine the type of consumable part based on the information read from the consumable-part-showing section, and to update information of the timing to replace the consumable part included in the consumable-part information.

In the analyzing system described in Clause 8, when replacing a consumable part, the analysis operator does not need to manually update individual items of consumable-part information, but only needs to scan the code put on the consumable part to instruct the system to automatically update consumable-part information.

(Clause 9)

In the analyzing system described in one of Clauses 1-8, the analyzing device may be a chromatograph.

The analyzing system described in Clause 9 can be suitably used as an analyzing system for conducting an analysis using a chromatograph, which is a type of device that often requires a different setting of the target compound and analysis conditions for each sample, or a different data-analyzing method for each compound.

REFERENCE SIGNS LIST

1 . . . Analyzing System
10 . . . Gas Chromatograph Main Unit
11 . . . Sample Vaporization Chamber
12 . . . Autosampler
13 . . . Column
14 . . . Detector
15 . . . Gas Cylinder
16 . . . Flow Controller
17 . . . Column Oven
20 . . . System Controller
21 . . . Storage Section
22 . . . Code Information Extractor
23 . . . Information Sender
24 . . . Analysis Data Sender
30 . . . Two-Dimensional Code Reader
31 . . . Display Unit
40 . . . Control Computer
41 . . . Storage Section
411 . . . Analysis-Operator-Information Storage Section
412 . . . Compound Database
413 . . . Method-File Storage Section
414 . . . Consumable-Part-Information Storage Section
42 . . . Analyzing-System Software
421 . . . Analysis Operator Identifier
422 . . . Login Processor
423 . . . Method File Locator
424 . . . Analysis Condition Setter
425 . . . Analysis Controller
426 . . . Data Analyzer
427 . . . Analysis Result Outputter
428 . . . Method File Creator
429 . . . Consumable-Part-Information Updater

The invention claimed is:

1. An analyzing system including an analyzing device located in an analyzing room for analyzing a sample and a control computer located in a control room different from the analyzing room configured to communicate with the analyzing device, wherein:

the analyzing device comprises:

an information input receiver configured to receive an input of information which is encoded in a predetermined format and specifies a method file;

an information sender configured to send the control computer the information received by the information input receiver; and an input unit configured to receive an input instructing start of analysis, and the control computer comprises:

a storage section in which a plurality of method files each describing an analysis condition are stored;

a method file locator configured to locate a method file corresponding to the information sent from the information sender among the plurality of method files;

an analysis condition setter configured to set an analysis condition of the analyzing device based on the method file located by the method file locator; and an analysis controller configured to control an operation of the analyzing device based on the analysis condition and to perform an analysis, upon the input unit receiving the input.

2. The analyzing system according to claim 1, wherein:

the method files stored in the storage section further include information concerning a data-analyzing method, and a compound database is further stored in the storage section;

the analyzing device further comprises:

an analysis data sender configured to send analysis data to the control computer; and the control computer further comprises:

a data analyzer configured to analyze analysis data received from the analysis data sender, by using a data-analyzing method described in the method file located by the method file locator, with reference to the compound database, to perform a data analysis for a compound described in the method file.

3. The analyzing system according to claim 2, wherein:

the control computer further comprises an analysis result outputter configured to output a result of a data analysis performed by the data analyzer as well as an analysis condition used for an analysis of the sample and the data-analyzing method used for the data analysis, where the analysis condition and the data-analyzing method are encoded in a predetermined format.

4. The analyzing system according to claim 3, wherein:

the information input receiver is further configured to receive an input of information of an analysis condition and/or data-analyzing method encoded in a predetermined format; and the control computer further includes a method file creator configured to create a method file describing the received analysis condition and/or data-analyzing method, and to store the method file in the storage section.

5. The analyzing system according to claim 1, wherein the information which is encoded in a predetermined format and specifies a method file is shown on a sample container.

6. The analyzing system according to claim 5, wherein the information shown on the sample container further includes information related to a property of a sample.

7. The analyzing system according to claim 1, wherein:
the information input receiver is configured to receive an input of information which is encoded in a predetermined format and identifies an analysis operator;
the storage section further contains identification information related to a plurality of analysis operators;
the control computer further comprises:
an analysis operator identifier configured to identify an analysis operator corresponding to the information sent from the information sender among the plurality of analysis operators; and
a login processor configured to perform a login processing for allowing the analysis operator identified by the analysis operator identifier to log into the control computer; and
the analysis condition setter and the analysis controller are configured to begin operating in response to the login processing.

8. The analyzing system according to claim 1, wherein:
consumable-part information is further stored in the storage section, the consumable-part information including information representing a type of consumable part used in the analyzing device and a timing to replace the consumable part;
the information input receiver is configured to read information which is encoded in a predetermined format and specifies the type of consumable part, from a consumable-part-showing section on which this information is shown; and
the control computer comprises:
a consumable-part-information updater configured to determine the type of consumable part based on the information read from the consumable-part-showing section, and to update information of the timing to replace the consumable part included in the consumable-part information.

9. The analyzing system according to claim 1, wherein the analyzing device is a chromatograph.

* * * * *